(12) United States Patent
Xu et al.

(10) Patent No.: US 11,201,447 B2
(45) Date of Patent: Dec. 14, 2021

(54) MULTI-PULSE AMPLIFICATION

(71) Applicant: IMRA AMERICA, INC., Ann Arbor, MI (US)

(72) Inventors: Jingzhou Xu, Ann Arbor, MI (US); Takashi Hori, Ann Arbor, MI (US); Shigeru Suzuki, Ann Arbor, MI (US); Gyu Cheon Cho, Ann Arbor, MI (US)

(73) Assignee: IMRA AMERICA, INC., Ann Arbor, MI (US)

( * ) Notice: Subject to any disclaimer, the term of this patent is extended or adjusted under 35 U.S.C. 154(b) by 174 days.

(21) Appl. No.: 16/717,979

(22) Filed: Dec. 17, 2019

(65) Prior Publication Data
US 2020/0127431 A1    Apr. 23, 2020

Related U.S. Application Data

(63) Continuation of application No. PCT/US2018/042654, filed on Jul. 18, 2018.

(60) Provisional application No. 62/536,634, filed on Jul. 25, 2017.

(51) Int. Cl.
*H01S 3/10* (2006.01)
*H01S 3/00* (2006.01)
*H01S 3/067* (2006.01)
*G02F 1/39* (2006.01)
(Continued)

(52) U.S. Cl.
CPC ............ *H01S 3/0057* (2013.01); *H01S 3/005* (2013.01); *H01S 3/06725* (2013.01); *H01S 3/10046* (2013.01); *H01S 3/10061* (2013.01); *H01S 3/10084* (2013.01); *G02F 1/39* (2013.01);
(Continued)

(58) Field of Classification Search
CPC .. H01S 3/0057; H01S 3/3005; H01S 3/10084; H01S 3/06725; H01S 3/10046; H01S 3/10061; H01S 3/1106; H01S 3/06754
See application file for complete search history.

(56) References Cited

U.S. PATENT DOCUMENTS

| 5,696,782 | A | 12/1997 | Harter et al. |
| 6,664,498 | B2 | 12/2003 | Forsman et al. |
| 6,770,544 | B2 | 8/2004 | Sawada |

(Continued)

FOREIGN PATENT DOCUMENTS

| JP | 2013-146747 A | 8/2013 |
| JP | 2014-090011 A | 5/2014 |
| JP | 2015-115483 A | 6/2015 |

OTHER PUBLICATIONS

Burakov et al., "Theoretical investigations of material modification using temporally shaped femtosecond laser pulses", Applied Physics A, 81, 1639-1645 (2005), DOI: 10.1007/s00339-05-3320-3, in 7 pages.

(Continued)

*Primary Examiner* — Kinam Park
(74) *Attorney, Agent, or Firm* — Knobbe, Martens, Olson & Bear, LLP

(57) ABSTRACT

Chirped pulse amplification (CPA) systems configured to generate and amplify multi-pulses are described. The nonlinear interaction of pulses can generate a multiple pulse pack with a dense time separation between pulses. Reducing or eliminating the nonlinear interaction can be provided by spectrally and/or temporally splitting pulses in the chirped amplification system.

27 Claims, 10 Drawing Sheets

(51) Int. Cl.
    *H01S 3/109* (2006.01)
    *H01S 3/11* (2006.01)
(52) U.S. Cl.
    CPC .......... *G02F 1/392* (2021.01); *H01S 3/06754* (2013.01); *H01S 3/109* (2013.01); *H01S 3/1106* (2013.01)

(56) References Cited

U.S. PATENT DOCUMENTS

| | | | |
|---|---|---|---|
| 6,885,683 B1* | 4/2005 | Fermann | H01S 3/06754 372/25 |
| 8,158,493 B2 | 4/2012 | Shah et al. | |
| 9,153,928 B2* | 10/2015 | Fermann | G01N 21/636 |
| 2001/0009250 A1 | 7/2001 | Herman et al. | |
| 2002/0167581 A1 | 11/2002 | Cordingley et al. | |
| 2003/0151053 A1 | 8/2003 | Sun et al. | |
| 2005/0115930 A1 | 6/2005 | Tanaka et al. | |
| 2005/0218122 A1 | 10/2005 | Yamamoto et al. | |
| 2005/0226287 A1 | 10/2005 | Shah et al. | |
| 2009/0273828 A1 | 11/2009 | Waarts et al. | |
| 2010/0025387 A1 | 2/2010 | Arai et al. | |
| 2012/0064695 A1 | 3/2012 | Boyle et al. | |
| 2013/0026153 A1 | 1/2013 | Ide et al. | |
| 2015/0043597 A1* | 2/2015 | Yusim | H01S 3/2383 372/6 |
| 2015/0063380 A1* | 3/2015 | Liu | H01S 3/2383 372/6 |
| 2015/0214439 A1 | 7/2015 | Herner | |
| 2015/0380892 A1* | 12/2015 | Fermann | G01N 21/31 356/301 |
| 2017/0098733 A1 | 4/2017 | Tamemoto et al. | |

OTHER PUBLICATIONS

Hertel et al., "On the physics of material processing with femtosecond lasers", Focused on Laser Precision Microfabrication, RIKEN Review No. 32 (Jan. 2001), in 8 pages.

Stoian et al., "Ultrafast laster material processing using dynamic temporal pulse shaping", Focused on Laser Precision Microfabrication, RIKEN Review No. 50 (Jan. 2003), in 6 pages.

* cited by examiner

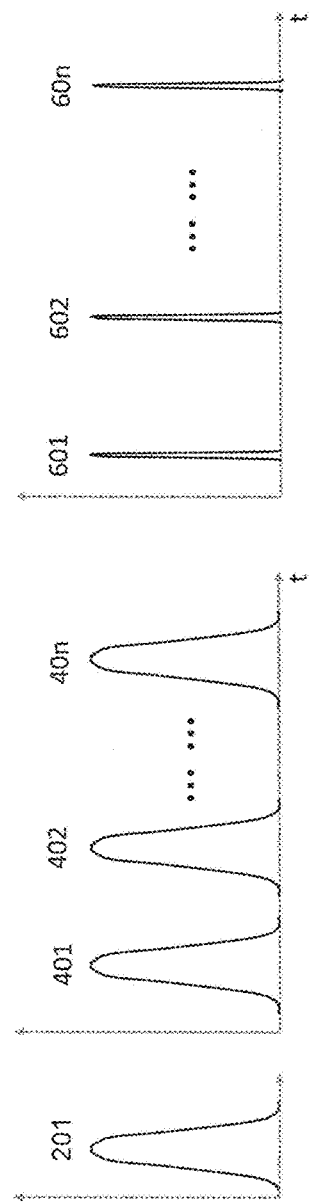

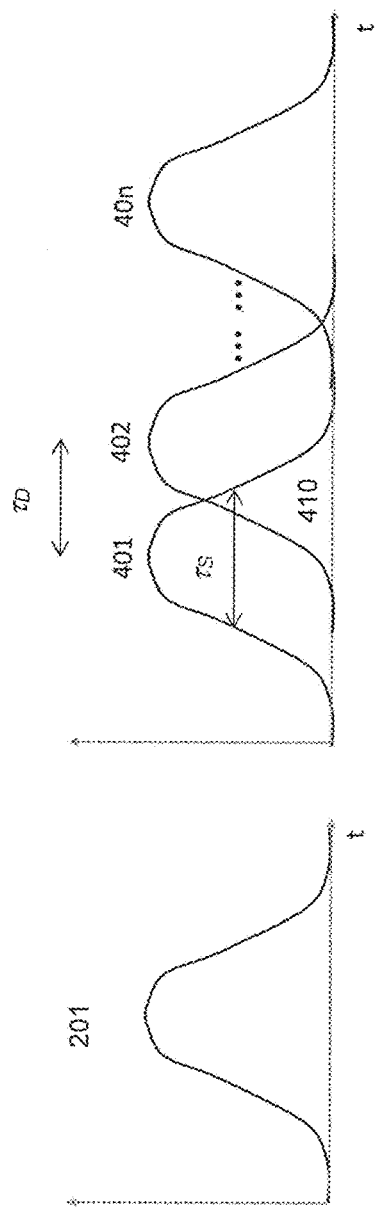

MULTI-PULSE AMPLIFICATION

CROSS-REFERENCE TO RELATED APPLICATIONS

This application is a continuation of international PCT application no. PCT/US2018/042654, filed Jul. 18, 2018, entitled MULTI-PULSE AMPLIFICATION, which claims the benefit of priority to U.S. Patent Application No. 62/536,634, filed Jul. 25, 2017, entitled MULTI-PULSE AMPLIFICATION; all of the foregoing are hereby incorporated by reference herein in their entireties.

BACKGROUND

Field

The present disclosure relates to chirped pulse amplification systems, which generate multiple laser pulses with a desired delay between each pulse.

Description of the Related Art

Ultrashort pulsed lasers, whose pulse width $\tau_0$ can be on the order of $10^{-15}$ to $10^{-11}$ second, have demonstrated superior advantages comparing to lasers with even longer $\tau_0$ (e.g., nanoseconds), in many applications, such as laser material processing.

Chirped pulse amplification (CPA) is an advantageous technique for generating ultrashort pulses with high pulse energy $E_p$. In a chirped pulse amplifier, a seed pulse train generated by a mode locked oscillator is first stretched to longer pulse width $\tau_S$ by applying an optical group delay dispersion $D(\lambda)$ (in units of ps/nm), which is the derivative of the group delay with respect to wavelength $\lambda$, before amplifying. Where the group delay means that different wavelength of light takes different time to pass a certain media. The amplified pulses are then compressed back to ultrashort pulse width using the opposite group delay dispersion $-D(\lambda)$. Output from an oscillator usually has a repetition rate $F_R$ on the order of MHz to GHz range, and the temporal delay between adjacent pulses $\tau_{DO}=1/F_R$ is on the order of nanosecond to microsecond range. To generated a pulse with high pulse energy $E_p$ while keeping the output average power relatively low, the output from a mode locked oscillator can be reduced by a time gating device to a much lower repetition rate $F_D \ll F_R$ before amplification. In some arrangements a single pulse train is selected at the reduced pulse repetition rate.

There can be challenges associated with such CPA systems.

SUMMARY

In some applications, multiple pulses (multi-pulses) with a desired delay are preferred. Accordingly, embodiments of systems and methods for multi-pulse amplification are described.

In an embodiment, a chirped pulse amplification system can be configured to amplify a seed optical pulse, wherein the seed optical pulse is split into multiple pulses and a delay is applied between each adjacent pulse, and the delay between adjacent pulses after compression is smaller than the stretched pulse duration inside a gain medium of the chirped pulse amplification system.

In an embodiment, a method for generating multiple pulses in a chirped pulse amplification system is provided. The method comprises receiving a seed pulse from a laser source, the seed pulse having an optical group delay dispersion $D(\lambda)$, where $\lambda$ is wavelength; stretching the seed pulse to produce a stretched pulse have a stretched pulse width; splitting the stretched pulse into a pulse pack comprising a plurality of pulses having different wavelengths; applying a time delay to each of the plurality of pulses in the pulse pack, the time delay having the same sign as the optical group delay dispersion; amplifying each of the plurality of pulses in the pulse pack; and compressing each of the plurality of pulses in the pulse pack.

In an embodiment, a chirped pulse amplification (CPA) system comprises a seed laser source configured to output seed pulses; a stretcher configured to stretch the seed pulses to output stretched pulses; a splitter configured to split each of the stretched pulses into a plurality of split pulses; a delay configured to apply a delay to each of the plurality of split pulses; an amplifier configured to amplify each of the delayed, split pulses; and a compressor configured to compress each of the amplified, delayed, split pulses to output a plurality of optical pulses.

The foregoing summary and the following drawings and detailed description are intended to illustrate non-limiting examples but not to limit the disclosure.

BRIEF DESCRIPTION OF THE DRAWINGS

FIGS. 2A, 2B, and 2C schematically illustrate results of a conventional beam splitting and combining arrangement to generate multiple pulses.

FIGS. 3A and 3B schematically illustrate a beam splitting method in accordance with the present disclosure. A temporally stretched and chirped pulse (FIG. 3A) is split and recombined to generate multiple pulses in which the chirped pulses may overlap (FIG. 3B). In FIG. 3B, $\tau_D$ is the delay between adjacent pulses (e.g., measured from peak-to-peak), and $\tau_S$ is the stretched pulse width (e.g., measured as full width at half maximum (FWHM)).

The figures depict various embodiments of the present disclosure for purposes of illustration and are not intended to be limiting. Wherever practicable, similar or like reference numbers or reference labels may be used in the figures and may indicate similar or like functionality.

DETAILED DESCRIPTION

Overview

One method to generate multi-pulses is to select multiple pulses instead of a single pulse in the pulse train out of the oscillator. However, the delay between the adjacent pulses is usually in the nanosecond range or longer, determined by the pulse round trip in the oscillator. Adjusting the delay value typically requires changing the oscillator cavity, and it is not an easy implementation in practice when this technique is used.

To obtain even a shorter delay between pulses, a single pulse can be split spatially to form multiple pulses with time delays relative to each other. Using this technique, the time delays between adjacent pulses can be set comparable to the pulse width $\tau_0$. For many applications of the lasers, collinear output of the pulses is highly desirable. Therefore, the free space optical setup associated with this technique does not only increase cost and complexity of the system, but also induces instability, and sacrifices the output power. The technical challenges of this approach will remain for the free space approach, particularly for splitting the pulses in the seeding stage and post-amplification stage.

When implementing the pulse splitting with fiber technology, the overall laser design can be rather compact and environmentally stable, especially when the seed pulses are split before the amplifier. Using the fiber optics, the seed pulse splitting and delay can be made more easily and with more flexibility. Splitting pulses before the amplifier can reduce peak power and facilitate using the full available output from the amplifier.

Figure 1:
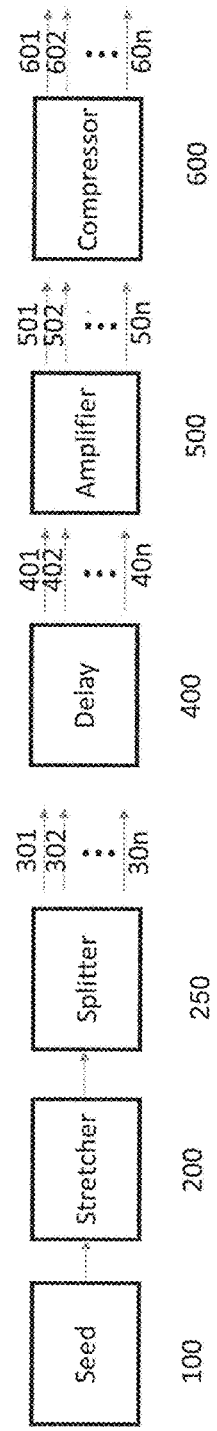
FIG. 1 is a block diagram of an example of a chirped pulse amplification (CPA) system with multiple pulse output.

FIG. 1 depicts an example of a CPA system with multiple pulse output. The CPA system comprises a seed laser source 100, a stretcher 200, and a splitter 250, which splits a pulse from the stretcher 200 into multiple pulses 301, 302, . . . , 30n. The multi-pulses pass to a delay 400, which outputs delayed pulses 401, 402, . . . , 40n, which are amplified by the amplifier 500 to produce amplified pulses 501, 502, . . . , 50n. The amplified multi-pulses can optionally be compressed by a pulse compressor 600 to produce compressed pulses 601, 602, . . . , 60n. In some embodiments of the CPA system, the number n of pulses in a multi-pulse pack can be in a range from 2 to 1000. In some embodiments of the CPA system, the number n of pulses in the multi-pulse pack can be greater than a number of seed input pulses (which can be 1, 2, 3, 4, 5, 10, or more). In various embodiments, the seed laser source can be a fiber laser; the amplifier 500 can comprise a fiber amplifier having a fiber gain medium (e.g., comprising a rare earth gain medium); the pulse stretcher 200 can output stretched pulses having a stretched pulse duration in a range of a few tens of picoseconds to a few nanoseconds; the pulse compressor 600 can output compressed pulses that are ultrashort pulses having a pulse duration in a range of a femtosecond to a picosecond. The splitter 250 can comprise a wavelength selective component such as, e.g., a filter, a diffractive grating, or an optical fiber. The pulse stretcher 200 may comprise a prism stretcher, grating stretcher, a fiber stretcher, a fiber Bragg grating, a chirped mirror, etc. The pulse compressor 600 may comprise a prism compressor, grating compressor, a fiber compressor, a fiber Bragg grating, a chirped mirror, etc.

FIGS. 2A, 2B, and 2C show results of a conventional beam splitting method using an embodiment of a CPA system similar to that shown in FIG. 1. A seed pulse 201 (FIG. 2A) is split into multiple pulses 401, 402, . . . , 40n, and each of the split pulses is a duplicate of the original pulse. Time delay between pulses is applied to separate the pulses (FIG. 2B) before the group of the pulses is amplified. If preferred, the amplified pulses can be compressed after amplification, and ultrafast pulses 601, 602, . . . , 60n are generated with delay between pulses (FIG. 2C). This method can be applied to CPA or non-CPA systems.

However, if the approach of splitting seed pulses of FIGS. 2A-2C is applied to a CPA system, the following situation as schematically illustrated in FIGS. 3A and 3B can occur. If the delay $\tau_D$ between adjacent pulses 401 and 402 (see FIG. 3B) is shorter than the stretched pulse width, $\tau_S$, namely $\tau_D < \tau_S$, adjacent pulses can have an overlap 410 in the beam paths, including in the amplifier 500, before they are recompressed by the pulse compressor 600. It is possible that an undesired nonlinear interaction, for example cross phase modulation (XPM), between pulses may happen in the amplifier material, either in solid state or fiber gain media. In addition such nonlinear interaction may also occur in the media outside of the amplifier. The probability of nonlinear interaction is also increased if the pulses are guided in optical fibers, e.g., due to optical nonlinear interactions in the fiber. The nonlinear interaction between pulses may result in significant changes in the spectral and/or temporal properties of the output.

Example Multi-Pulse Generation Techniques

Although some techniques may be designed to avoid the change of the pulse form, such change in pulse form can also lead to formation of multiple pulses with the time delay in a range from a few hundreds of femtosecond to a few nanoseconds. The detail of the pulse formation depends on the optical nonlinear interactions in the fiber, e.g., pulse energy, peak power, fiber mode field diameter, among others. The generation of multiple pulses in this approach can also be useful depending on the laser application. Although individual pulses were observed to be more susceptible to the details of the nonlinear optical parameters, which complicates modeling, the dense pulse pack as a whole is observed to be very stable, not different from the stability of the original pulse before splitting.

In one aspect, the present disclosure relates to generation of multiple pulses by splitting optical pulse(s) in a laser system. By way of example, in a chirped pulse amplification (CPA) arrangement, a dense pulse pack with a time delay between pulses shorter than the stretched pulse duration is provided. The dense pulse pack can include a number of pulses in a range from a few, to tens, to hundreds, or thousands of pulses.

Figure 4A:
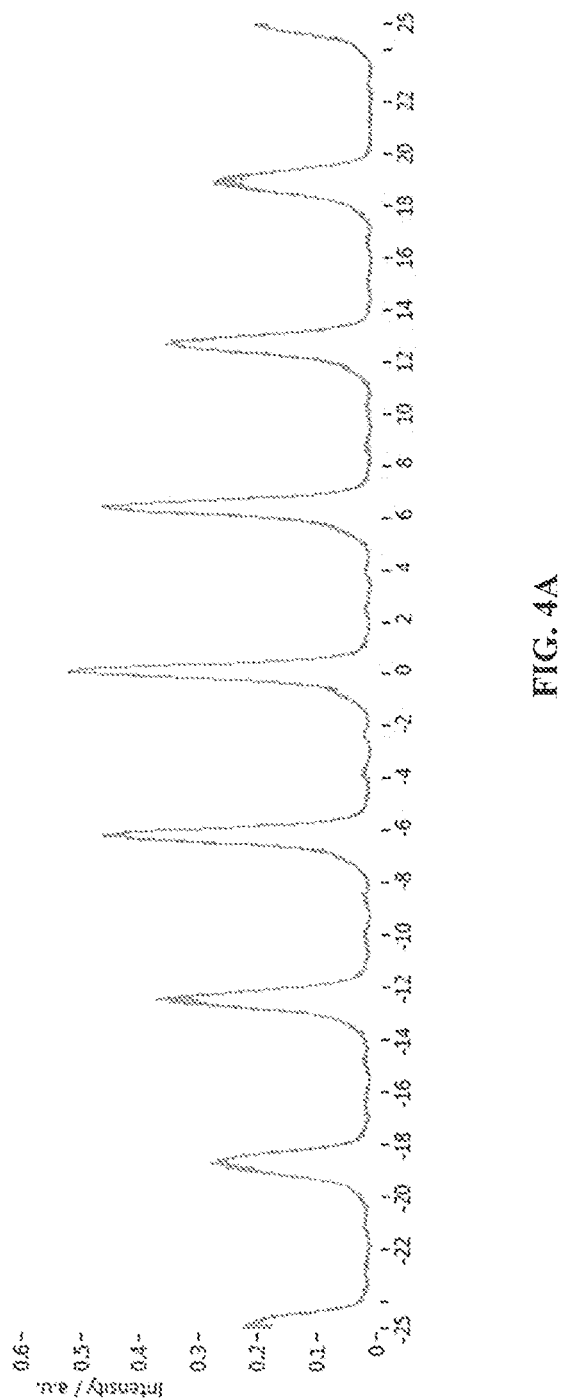
FIG. 4A is an autocorrelation plot from an experiment that illustrates an example of the formation of a dense pulse pack resulting from non-linear interaction of chirped pulses overlapping in time. Autocorrelation intensity (in arbitrary units, a.u.) is plotted against delay in ps.
Figure 4B:
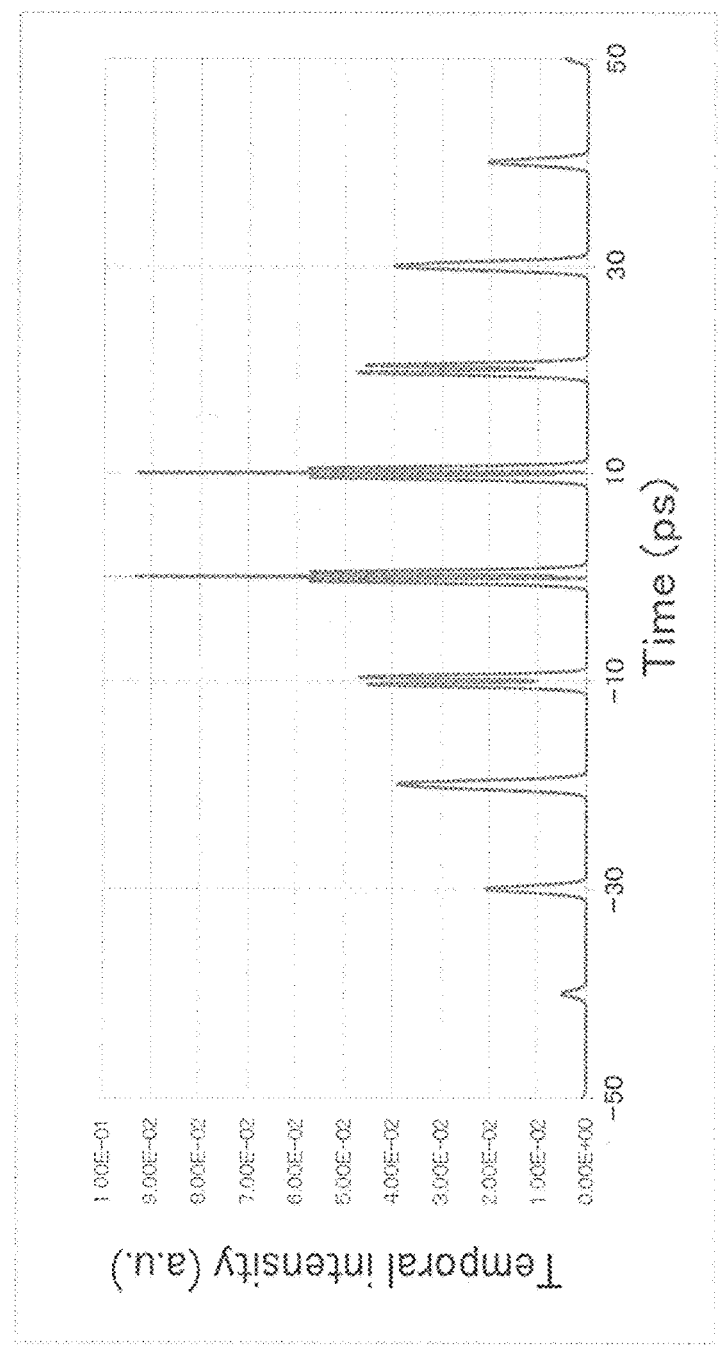
FIG. 4B shows an autocorrelation plot obtained with simulation of non-linear pulse propagation verifying control of the dense pulse pack in a system of the present disclosure. Temporal intensity (in a.u.) is plotted against delay time in ps.

In a first example, utilizing the nonlinear interaction between the pulses overlapping in time 410 (described with reference to FIG. 3B), a dense pulse pack can be generated as shown in FIG. 4A. The pulses of the dense pulse pack are a recompressed output of fiber based chirped pulse amplification measured with autocorrelation. As described with reference to FIGS. 2 and 3A, a seed pulse stretched in time 201 is split in time before the amplification and recompression. The time delay between two adjacent pulses 401, 402 is determined by the time overlap 410 of the stretched seed pulses. FIG. 4B shows a simulation result for two pulses interacting by nonlinear Schrodinger pulse propagation, with the parameters in Table 1. Although the detail simulation parameters are not sufficient to reproduce the exact quantitative agreement with the observations shown in FIG. 4A, and while not being bound by any particular theory, the simulation facilitates and confirms the above explanation: particularly the formation of a dense pulse pack. Temporal interval and number of pulses within the dense pulse pack can be controlled by tuning the initial delay. For instance, in FIG. 4B, if the initial delay changes from 0.10 ps to 20 ps, then the delay between adjacent pulses in the pulse pack will change from 10 ps to 20 ps. The properties of the pulse pack can also be controlled by adjusting the nonlinear interaction between pulses, for example, by changing the pulse intensity, varying the media length, aperture, etc. In some embodiments, if the fiber length changes from 5 m to 10 m, or 20 m, then the pulse numbers change from 12 to 20 to 36 pulses, respectively. Accordingly, adjusting the fiber length upward increases the number of pulses in the pulse pack, and adjusting the fiber length downward decreases the number of pulses in the pulse pack.

TABLE 1

Simulation parameters:

| Parameters | Values |
|---|---|
| Central wavelength | 1045 nm |
| Compressed pulse duration $\tau_0$ | 150 fs |
| Stretched pulse duration $\tau_S$ | 100 ps |
| Delay between pulses $\tau_D$ | 10 ps |
| Number of seed pulses | 2 |
| Peak power | 300 W |
| Propagation media | Single mode fiber |
| Propagation length | 5 m |

Figure 5A:
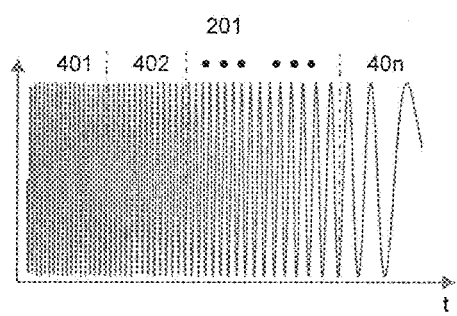
FIGS. 5A and 5B schematically illustrate an example of a wavelength splitting/time delay technique in which non-linear interaction between multiple pulses can be reduced or avoided via control of time delay and/or dispersion.

In at least one additional or alternative arrangement, the non-linear interaction of the stretched seed pulse is avoided as illustrated in FIG. 5A where the initial pulse 201 is split into multiple pulses with different wavelengths, e.g., using an optical filter, a diffractive grating, or an optical fiber. In FIG. 5A, the horizontal axis is time and the vertical axis shows pulse intensity. The oscillation frequency illustrates the pulse has normal dispersion, where the lower wavelength portion appears on the leading side of the pulse. The oscillation of the pulse form in FIG. 5A is intended as an example to illustrate the concept of frequency variation in a pulse. If the pulse has linear dispersion, which means $D(\lambda)$ is a constant within the laser bandwidth, the pulse form in the temporal domain represents the pulse in the spectral domain. On the other hand if the pulse contents include nonlinear dispersion, the pulse form can be different in both the temporal and the spectral domains. While for most CPA system, linear dispersion is predominant, thus before and after split, the pulse shape in the time domain should be substantially the same as the spectral shape. In the example in FIG. 5A, the pulse 201 is split in wavelength into portions 401, 402 . . . 40n. For example, in the illustrative chirped pulse 201, the portion 401 has higher frequency (and therefore shorter wavelength) components than the portion 402, which has lower frequency (and therefore longer wavelength) components than 401, and the portion 402 has correspondingly higher frequency (shorter wavelength) than the portion 403, and so forth on to the portion 40n, which has the lowest frequency (longest wavelength) of the split portions.

A time delay, $\tau_D$, can be applied with the same sign of the dispersion $D(\lambda)$. For example, for normal dispersion (where group velocity increases with wavelength), where the longer wavelengths are at the leading side of the pulse, time delay is applied to the split pulse with shorter wavelengths. For anomalous dispersion (where group velocity decreases with wavelength), where the shorter wavelengths are at the leading side of the pulse, delay is applied to the split pulse with longer wavelengths. Thus even if $\tau_D < \tau_S$, the pulses can be temporally separated from each other due to the dispersion $D(\lambda)$ as illustratively shown in FIG. 5B. Thus nonlinear interaction between pulses can be advantageously avoided or reduced to a negligible level in some such implementations.

Figure 5B:
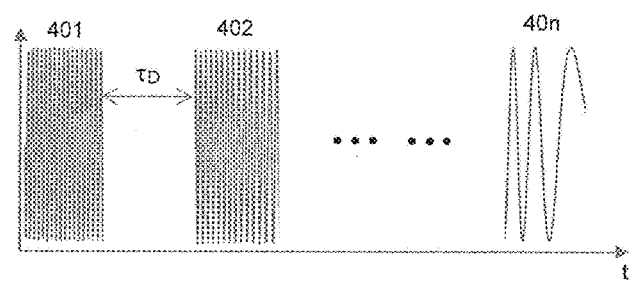

In general, a filter usually has a finite bandwidth $\Delta\lambda$, which is usually defined from 10% to 90% of its transmission profile, thus the pulses cannot in practice be as sharply split as schematically shown in FIGS. 5A and 5B. The minimum delay can be determined by the spectral separation or overlap between adjacent pulses and the dispersion of the stretched pulse. In some embodiments, a time delay $\tau_D > \Delta\lambda * D(\lambda)$ is preferred. In some cases, limited temporal overlapping, for example overlapping less than 10%, less than 25%, or less than 50%, between pulses is allowed. In some such cases, the temporal overlap may be limited to be small enough that the nonlinear interaction effect (e.g., XPM) does not substantially modify the pulse form.

The temporally split pulses (in the pulse pack) can be amplified (e.g., by the amplifier 500) and then recompressed (e.g., by the compressor 600) to output a dense pack of optical pulses.

Figure 6:
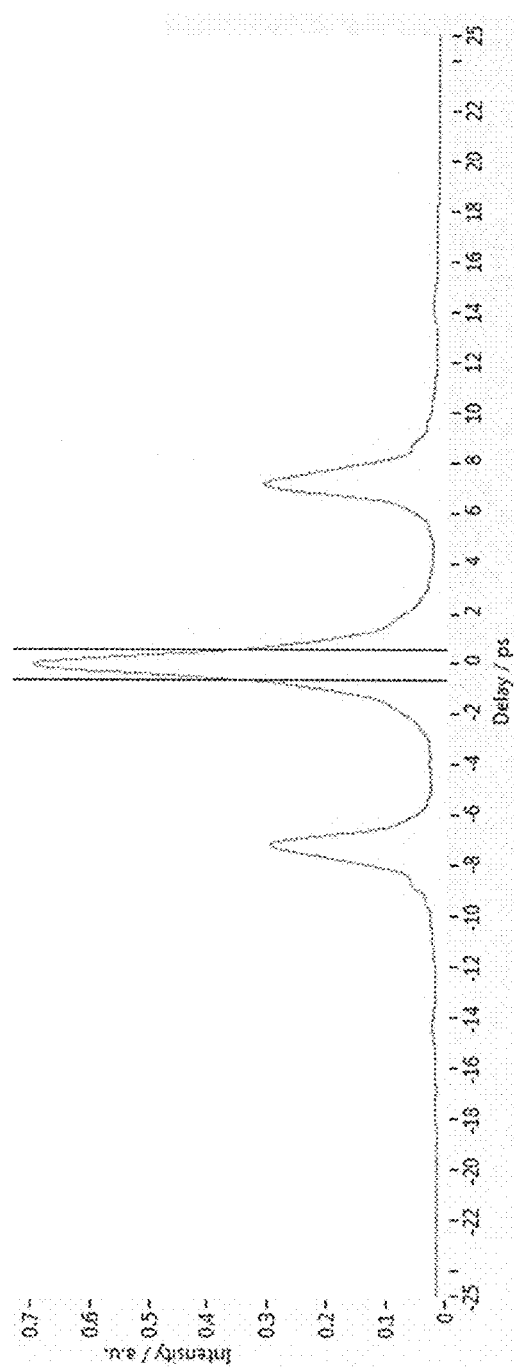
FIG. 6 is an autocorrelation plot which shows an example of the recompressed pulses when a spectral delay is applied in time-delaying the stretched seed pulse with two seed pulses, with $\tau_D \sim \tau_S/100$. The time delay $\tau_D$ between pulses is much less than the stretched pulse width $\tau_S$. Autocorrelation intensity (in a.u.) is plotted against delay in ps.

FIG. 6 is an autocorrelation plot from an experiment which shows an example of the recompressed pulses when the spectral delay is applied in time-delaying the stretched seed pulse with two seed pulses, with $\tau_D \tau_S/100$. The two vertical black lines show the full width half maximum (FWHM) of the central autocorrelation function. By reducing or eliminating the nonlinear interaction between the pulses, it can be kept the same as the number of the time-delayed seed pulses, two in this example.

Example Multi-Pulse Generation Systems

Figure 7:
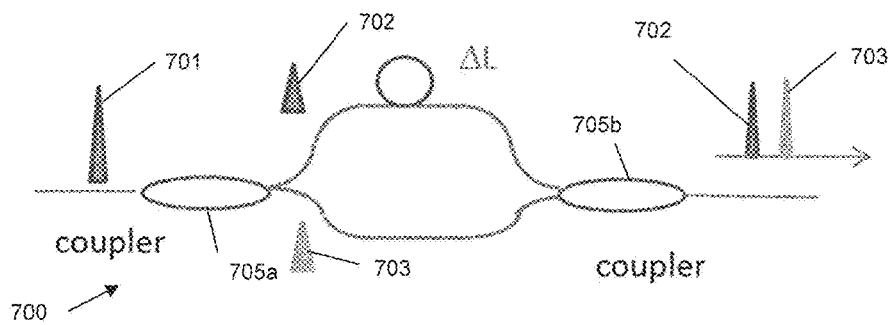
FIG. 7 schematically illustrates an example of a fiber based pulse delay that can be used to split pulses without using wavelength splitting.

The description above provides example techniques for creating split seed pulses with a certain time delay between the pulses. An example pulse delay 700 utilizing a fiber based splitter and combiner, for example a 3 dB coupler, in combination with different lengths of fiber is shown in FIG. 7. In this pulse delay, the wavelengths of the pulses are not split. A seed pulse 701 is first split into two pulses 702, 703 using a first fiber coupler 705a, and the split pulses 702, 703 propagate in different arms of the pulse delay. The split pulses 702, 703 are schematically shown as triangles in FIG. 7. Delay between the two split pulses 702, 703 is introduced by using a different length of fiber in each arm. For example, the upper arm of the delay 700 shown in FIG. 7 includes an additional length $\Delta L$ of fiber to provide a delay line. The split pulses from the two arms then can be combined into a single fiber using a second coupler 705b. Due to the delay $\Delta L$ of the upper arm, the pulse 702 propagating in the upper arm is delayed by $n\Delta L/c$ relative to the pulse 703 propagating in the lower arm, where n is the refractive index of the fiber through which the pulse 702 propagates, and c is the speed of light in vacuum. Therefore the upper arm pulse 702 follows the lower arm pulse 703 after combination as shown in FIG. 7. The amount of delay $\Delta L$ (and accordingly the amount of time delay $n\Delta L/c$) can be adjustable in some embodiments, for example, by using a variable optical fiber delay line.

Figure 8:
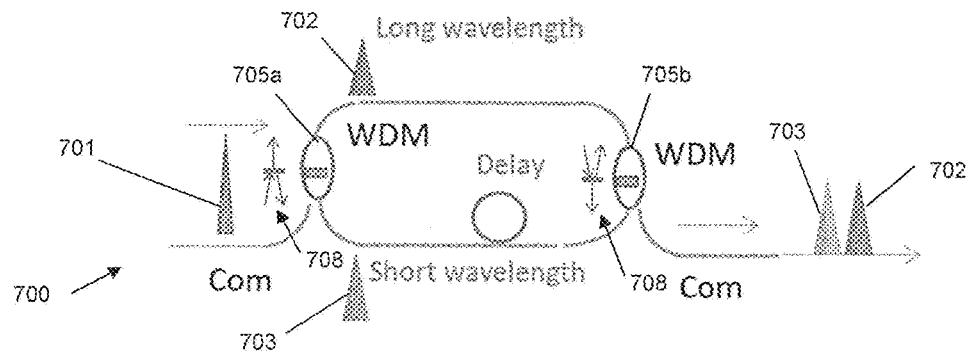
FIG. 8 illustrates an example of a fiber based pulse delay that can be used to split pulses and which utilizes wavelength splitting.
Figure 9:
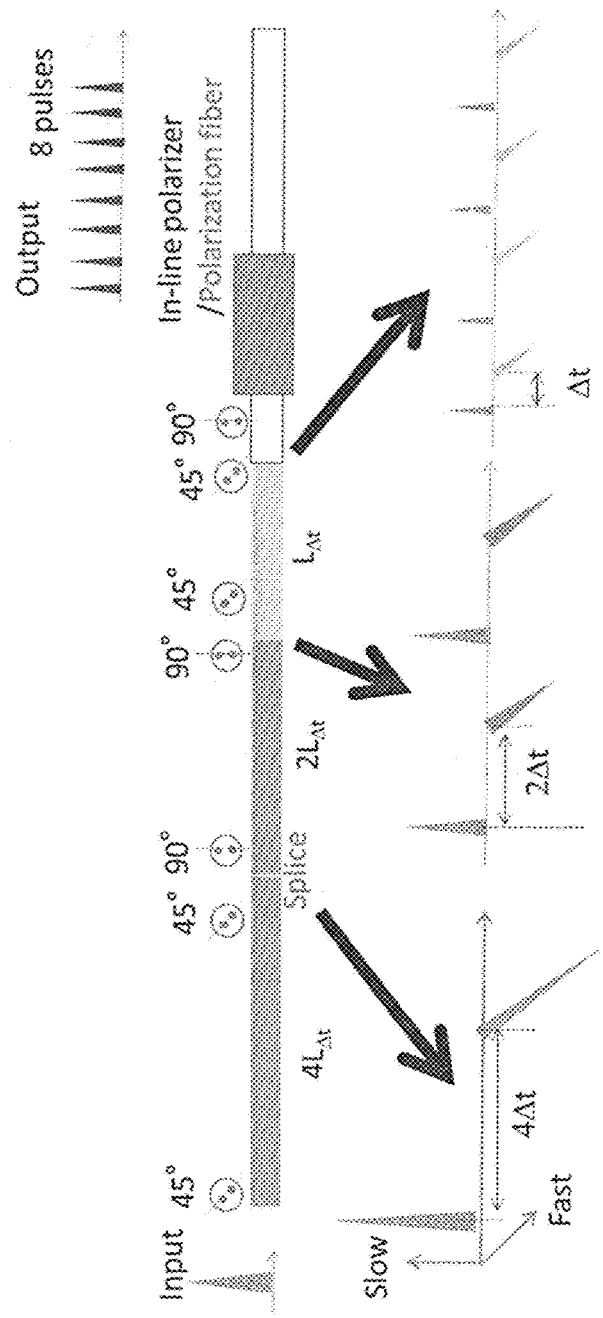
FIG. 9 schematically illustrates an example technique to generate multiple pulses with delays.

Another embodiment of a pulse delay 700 is shown in FIG. 8 that is generally similar to the delay shown in FIG. 7, but which utilizes wavelength splitting. In the delay 700 shown in FIG. 8, both couplers 705a, 705b comprise wavelength division multiplexers (WDM), which split and combine pulses based on their wavelength. A WDM can select wavelengths either through optical filtering or through fiber coupling. In some embodiments one or both of the WDMs in FIG. 8 includes a filter 708 which divides the wavelength at a desired location, e.g., at the middle of the signal spectrum, and with a desired bandwidth, e.g., <1 nm, or <2 nm, or <10 nm, etc. In FIG. 8, Com refers to the common port of a WDM, where both wavelengths are input to (e.g., as input pulse 701), or output from, the WDM. Other fiber coupled delay line devices, such as the difference of the polarization mode dispersion in a polarization maintaining fiber, as shown in FIG. 9, or fibers with different group dispersion delay such as dispersion shifted fibers, may also be used. A long pass filter can be used such that a longer wavelength pulse 702 propagates in the upper arm and a shorter wavelength pulse 703 propagates in the lower arm, which includes a delay line (which may be variable or adjustable, similarly as described with reference to FIG. 7). After being output from the second WDM 705b, the shorter wavelength pulse 703 follows behind the longer wavelength pulse 702, due to the time delay introduced by the delay line (e.g., a time delay of $n\Delta L/c$). If delay for the longer wavelength pulse 702 were desired (relative to the shorter wavelength pulse 703), the delay line could be introduced into the arm in which the longer wavelength pulse 702 propagates (rather than the arm in which the shorter pulse 703 propagates). Accordingly, embodiments of the wavelength delay 700 of FIG. 8 can be used to generate controllable time delay between pulses (which have different wavelengths) and arranged so that either the shorter wavelength pulses are delayed (relative to the longer wavelength pulses as shown in FIG. 8) or the longer wavelength pulses are delayed (relative to the shorter wavelength pulses).

FIG. 9 schematically illustrates an example technique to generate multiple pulses with delays. An input seed pulse propagates in a polarization maintaining (PM) fiber with linear polarization. A PM fiber has birefringence such that light polarized along one axis of the fiber travels at a different rate compared to light polarized orthogonal to this axis. The two principal transmission axes within the PM fiber are called fast and slow axes. The PM fiber can be spliced onto another section of PM fiber with a length L and with an angle offset θ that does not equal zero. The input seed pulse will typically have polarization components in both the fast and slow axes. Delay occurs between these two polarization components due to the birefringence in the PM fiber. The delay is $\Delta t = \Delta n*L/c$, where $\Delta n$ denotes the difference of effective refractive index between the fast and the slow axes. The offset angle can be used to control the amplitude ratio between these two polarizations. If no polarization dependent gain or loss is associated in the fiber section, an angle offset of θ=45 degrees can be applied to get equal pulse energy in each polarization state. Pulse splitting can be cascaded by using additional sections of PM fiber to make multiple pulses. Optionally, a polarizer, e.g., a fiber based in-line polarizer, may be used to obtain a pulse train in a particular linear polarization state.

FIG. 9 schematically illustrates an example PM fiber delay in which an input seed pulse is split into eight output pulses. In this example, three sections of PM fiber are cascaded, with the first section having a length 4L (denoted underneath by $4L_{\Delta t}$), the second section having a length 2L (denoted underneath by $2L_{\Delta t}$), and the third section having a length L (denoted underneath by $L_{\Delta t}$). The time delays introduced by these three sections are, respectively, 4Δt, 2Δt, and Δt, where as described above, $\Delta t = \Delta n*L/c$. The input pulse is received by the first PM fiber section, having a 45 degree angle offset. As shown in FIG. 9, the first PM fiber section splits the input pulse into two pulses separated by a time delay 4Δt (because the polarization components travel at different speeds along the slow and fast axes due to the birefringence of the PM fiber). These two pulses separated by the time delay 4Δt are shown in the plot below the fiber delay line. These two pulses are then received by the second section of PM fiber (with length 2L), which is oriented at 90 degrees (e.g., a 45 degree offset relative to the first PM fiber section), and which splits each entering pulse into a pair of pulses propagating at the fast and slow speeds. After propagating through the second section of PM fiber, four pulses exist, with time delays between the components of 2Δt (shown in the plot below the fiber delay line). The four pulses then enter the third section of PM fiber (with length L and angle offset of 45 degrees relative to the second section of PM fiber), which splits each of the four pulses into another pair of pulses having time delays of Δt (these pulses are shown in the plot below the fiber delay line). Accordingly, this example arrangement of three sections of PM fiber having lengths 4L, 2L, and L splits an initial input seed pulse into eight output pulses. The in-line polarizer can be used to obtain an output pulse train having a particular linear polarization state.

Although the example in FIG. 9 includes three PM fiber sections with lengths 4L, 2L, and L, in other implementations, different numbers of PM fiber sections can be used (e.g., 1, 2, 4, 5, 10, or more), and different lengths or combinations of lengths (than 4L, 2L, L) for the fiber sections can be used. For example, as will be further described with reference to FIG. 10, in some embodiments, the delay comprises a number N of PM fiber sections, with respective lengths varying geometrically (e.g., lengths L, 2L, 4L, ..., $2^{N-1}L$), which can produce a train of $2^N$ output pulses having time delays $\Delta n*L/c$ between successive output pulses. The number N can be in a range from 1 to 10 or more in various embodiments. Many variations are contemplated.

Figure 10:
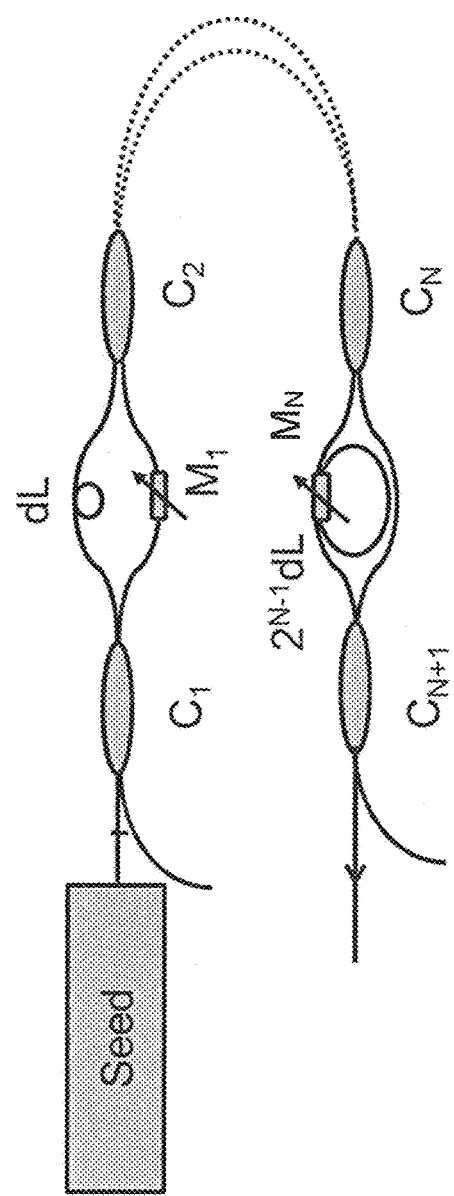
FIG. 10 schematically shows an example of a pulse delay generation system that can controllably generate multiple pulses with delays.

FIG. 10 shows an example of a pulse delay generation system for multiple pulses. In this system, N+1 2×2 fiber based couplers, e.g. a 3 dB coupler, $C_1, C_2, \ldots, C_N$, and $C_{N+1}$, are serially connected to each other, and the first coupler $C_1$ receives pulses from a seed source. A pair of fiber arms is disposed between each respective pair of couplers, with one of the pair of arms having a fiber length that is longer than the fiber length of the other arm. The fiber length difference between each arm can be set in a geometric series of dL, 2dL, $2^2$dL, ..., $2^{(N-1)}$dL as schematically illustrated in FIG. 10. When a seed pulse passes the first coupler pair with the shortest length difference (dL), the seed pulse is split into two pulses with a delay of ndL/c between them (where n is the refractive index of the fiber and c is the speed of light in vacuum; see the description of the delay line shown in FIG. 7). After passing the next coupler pair where the length difference equals 2dL, each of this first pair of pulses will be split into another pair such that there are a total of four pulses with delay 0, ndL/c, 2ndL/c, and 3ndL/c. This splitting continues for each successive pair of couplers so that a train of temporally spaced out (time delayed) pulses are generated. Using the system shown in FIG. 10, a total of $2^N$ pulses can be generated, with a delay between each adjacent pulse of ndL/c.

In the embodiment shown in FIG. 10, modulators $M_1$, $M_2$, ..., $M_N$ can (optionally) be disposed in one of the arms after one, some, or all of the couplers, $C_1$, $C_2$, ..., $C_N$, and $C_{N+1}$, so that the system can generate output pulses at almost any combination of pulses. FIG. 10 illustrates an embodiment with N modulators. An example of a modulator can be an on-off switch. The number of output pulses becomes half if any one modulator is set to off. For example, if the first modulator $M_1$ is set to be off, then the output pulse train includes $2^{N-1}$ pulses with a delay between adjacent pulses 2ndL/c (the time delay introduced by the second coupler pair). As another example, if the last modulator $M_N$ is set to be off, then the output pulse train contains $2^{N-1}$ pulses with a delay between adjacent pulses ndL/c, thus the width of pulse train is reduced to half. Setting other modulator(s) to be off can create a pulse train with different numbers of pulses or with different combinations of pulse delays. The example pulse delay shown in FIG. 10 uses delays set as a geometric series, however in other embodiments, the series of delays can be set with any orders.

Additional Aspects

In a first aspect, a chirped pulse amplification system configured to amplify a seed optical pulse, wherein the seed optical pulse is split into multiple pulses and a delay is applied between each adjacent pulse, and the delay between adjacent pulses after compression is smaller than the stretched pulse duration inside a gain medium of the chirped pulse amplification system.

In a second aspect, the chirped pulse amplification system according to aspect 1, wherein the gain medium comprises an optical fiber.

In a third aspect, the chirped pulse amplification system according to aspect 1 or aspect 2, further comprising a pulse compressor configured to output compressed pulses that are ultrashort pulses having a pulse duration in a range of a femtosecond to a picosecond.

In a fourth aspect, the chirped pulse amplification system according to any one of aspects 1 to 3, further comprising a pulse stretcher configured to output stretched pulses having a stretched pulse duration in a range of a few tens of picoseconds to a few nanoseconds.

In a fifth aspect, the chirped pulse amplification system according to any one of aspects 1 to 4, wherein the delay is in a range of a few hundreds of femtoseconds to a few nanoseconds.

In a sixth aspect, the chirped pulse amplification system according to any one of aspects 1 to 5, wherein an output of the chirped pulse amplification system comprises a pulse pack with more pulses than the number of input seed optical pulses.

In a seventh aspect, the chirped pulse amplification system in aspect 6, where a form of the pulse pack is controlled by delay between adjacent seed optical pulses.

In an eighth aspect, the chirped pulse amplification system in aspect 6 or in aspect 7, where a form of the pulse pack is controlled by interaction among amplified pulses.

In a ninth aspect, the chirped pulse amplification system according to any one of aspects 1 to 8, wherein a wavelength selective component is used to split the seed pulse.

In a 10th aspect, the chirped pulse amplification system according to aspect 9, wherein the wavelength selective component comprises a filter.

In an 11th aspect, the chirped pulse amplification system according to aspect 9 or aspect 10, wherein the wavelength selective component comprises a diffractive grating.

In a 12th aspect, the chirped pulse amplification system according to any one of aspects 9 to 11, wherein the wavelength selective component comprises an optical fiber input and an output.

In a 13th aspect, a method for generating multiple pulses in a chirped pulse amplification system is provided. The method comprises receiving a seed pulse from a laser source, the seed pulse having an optical group delay dispersion $D(\lambda)$, where $\lambda$ is wavelength; stretching the seed pulse to produce a stretched pulse have a stretched pulse width; splitting the stretched pulse into a pulse pack comprising a plurality of pulses having different wavelengths; applying a time delay to each of the plurality of pulses in the pulse pack, the time delay having the same sign as the optical group delay dispersion; amplifying each of the plurality of pulses in the pulse pack; and compressing each of the plurality of pulses in the pulse pack.

In a 14th aspect, the method of aspect 13, wherein the time delay is greater than $\Delta\lambda * D(\lambda)$, where $\Delta\lambda$ is a wavelength overlap between adjacent stretched pulses.

In a 15th aspect, the method of aspect 13 or aspect 14, wherein splitting the stretched pulse into a pulse pack comprises splitting the stretched pulse or a pulse in the pulse pack into a pair of pulses; and delaying a first pulse in the pair of pulses relative to a second pulse in the pair of pulses.

In a 16th aspect, the method of aspect 15, wherein the first pulse and the second pulse in the pair of pulses have different wavelengths.

In a 17th aspect, a chirped pulse amplification (CPA) system comprises a seed laser source configured to output seed pulses; a stretcher configured to stretch the seed pulses to output stretched pulses; a splitter configured to split each of the stretched pulses into a plurality of split pulses; a delay configured to apply a delay to each of the plurality of split pulses; an amplifier configured to amplify each of the delayed, split pulses; and a compressor configured to compress each of the amplified, delayed, split pulses to output a plurality of optical pulses.

In an 18th aspect, the CPA system of aspect 17, wherein the seed laser source comprises a fiber laser.

In a 19th aspect, the CPA system of aspect 17 or aspect 18, wherein the stretcher comprises a fiber-based stretcher.

In a 20th aspect, the CPA system of any one of aspects 17 to 19, wherein the splitter comprises a wavelength selective component configured to split a stretched pulse into the plurality of split pulses having different wavelengths.

In a 21st aspect, the CPA system of any one of aspects 17 to 20, wherein the delay comprises a coupler, a first arm and a second arm, with the length of the first arm longer than the second arm, wherein the coupler is configured to split a pulse between the first arm and the second arm.

In a 22nd aspect, the CPA system of aspect 21, wherein the coupler comprises a wavelength division multiplexer.

In a 23rd aspect, the CPA system of any one of aspects of 17 to 22, wherein the delay comprises a plurality of concatenated sections of polarization maintaining (PM) optical fiber.

In a 24th aspect, the CPA system of any one of aspects 17 to 23, wherein the delay comprises a plurality of fiber-based couplers configured to produce pulses having a geometric series of time delays.

In a 25th aspect, the CPA system of aspect 24, further comprising a plurality of modulators.

In a 26th aspect, the CPA system of any one of aspects 17 to 25, wherein the delayed, split pulses are separated temporally.

In a 27th aspect, the CPA system of any one of aspects 17 to 25, wherein the delayed, split pulses are at least partially overlapped and the plurality of optical pulses output by the CPA system comprise a dense optical pulse pack.

Additional Information

Thus, the invention has been described in several non-limiting embodiments. It is to be understood that the embodiments are not mutually exclusive, and elements described in connection with one embodiment may be combined with, rearranged, or eliminated from other embodiments in suitable ways to accomplish desired design objectives. No single feature or group of features is necessary or required for each embodiment. All possible combinations and sub-combinations of elements are included within the scope of this disclosure.

For purposes of summarizing the present invention, certain aspects, advantages and novel features of the present invention are described herein. It is to be understood, however, that not necessarily all such advantages may be achieved in accordance with any particular embodiment. Thus, the present invention may be embodied or carried out in a manner that achieves one or more advantages without necessarily achieving other advantages as may be taught or suggested herein.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" or "the" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. A chirped pulse amplification system configured to amplify a seed optical pulse,
wherein the seed optical pulse is split into multiple pulses and a delay is applied between each adjacent pulse, and
the delay between adjacent pulses after compression is smaller than the stretched pulse duration inside a gain medium of the chirped pulse amplification system.

2. A chirped pulse amplification system according to claim 1, wherein the gain medium comprises an optical fiber.

3. A chirped pulse amplification system according to claim 1, further comprising a pulse compressor configured to output compressed pulses that are ultrashort pulses having a pulse duration in a range of a femtosecond to a picosecond.

4. A chirped pulse amplification system according to claim 1, further comprising a pulse stretcher configured to output stretched pulses having a stretched pulse duration in a range of a few tens of picoseconds to a few nanoseconds.

5. A chirped pulse amplification system according to claim 1, wherein the delay is in a range of a few hundreds of femtoseconds to a few nanoseconds.

6. A chirped pulse amplification system according to claim 1, wherein an output of the chirped pulse amplification system comprises a pulse pack with more pulses than the number of input seed optical pulses.

7. A chirped pulse amplification system in claim 6, where a form of the pulse pack is controlled by delay between adjacent seed optical pulses.

8. A chirped pulse amplification system in claim 6, where a form of the pulse pack is controlled by interaction among amplified pulses.

9. A chirped pulse amplification system according to claim 1, wherein a wavelength selective component is used to split the seed pulse.

10. A chirped pulse amplification system according to claim 9, wherein the wavelength selective component comprises a filter.

11. A chirped pulse amplification system according to claim 9, wherein the wavelength selective component comprises a diffractive grating.

12. A chirped pulse amplification system according to claim 9, wherein the wavelength selective component comprises an optical fiber input and an output.

13. A method for generating multiple pulses in a chirped pulse amplification system, the method comprising:
receiving a seed pulse from a laser source, the seed pulse having an optical group delay dispersion D(λ), where λ is wavelength;
stretching the seed pulse to produce a stretched pulse have a stretched pulse width;
splitting the stretched pulse into a pulse pack comprising a plurality of pulses having different wavelengths;
applying a time delay to each of the plurality of pulses in the pulse pack, the time delay having the same sign as the optical group delay dispersion;

amplifying each of the plurality of pulses in the pulse pack; and compressing each of the plurality of pulses in the pulse pack.

14. The method of claim 13, wherein the time delay is greater than $\lambda 2*D(\lambda)$, where $\Delta\lambda$ is a wavelength overlap between adjacent stretched pulses.

15. The method of claim 13, wherein splitting the stretched pulse into a pulse pack comprises:

splitting the stretched pulse or a pulse in the pulse pack into a pair of pulses; and delaying a first pulse in the pair of pulses relative to a second pulse in the pair of pulses.

16. The method of claim 15, wherein the first pulse and the second pulse in the pair of pulses have different wavelengths.

17. A chirped pulse amplification (CPA) system comprising:

a seed laser source configured to output seed pulses;

a stretcher configured to stretch the seed pulses to output stretched pulses;

a splitter configured to split each of the stretched pulses into a plurality of split pulses;

a delay configured to apply a delay to each of the plurality of split pulses;

an amplifier configured to amplify each of the delayed, split pulses; and a compressor configured to compress each of the amplified, delayed, split pulses to output a plurality of optical pulses.

18. The CPA system of claim 17, wherein the seed laser source comprises a fiber laser.

19. The CPA system of claim 17, wherein the stretcher comprises a fiber-based stretcher.

20. The CPA system of claim 17, wherein the splitter comprises a wavelength selective component configured to split a stretched pulse into the plurality of split pulses having different wavelengths.

21. The CPA system of claim 17, wherein the delay comprises a coupler, a first arm and a second arm, with the length of the first arm longer than the second arm, wherein the coupler is configured to split a pulse between the first arm and the second arm.

22. The CPA system of claim 21, wherein the coupler comprises a wavelength division multiplexer.

23. The CPA system of claim 17, wherein the delay comprises a plurality of concatenated sections of polarization maintaining (PM) optical fiber.

24. The CPA system of claim 17, wherein the delay comprises a plurality of fiber-based couplers configured to produce pulses having a geometric series of time delays.

25. The CPA system of claim 24, further comprising a plurality of modulators.

26. The CPA system of claim 17, wherein the delayed, split pulses are separated temporally.

27. The CPA system of claim 17, wherein the delayed, split pulses are at least partially overlapped and the plurality of optical pulses output by the CPA system comprise a dense optical pulse pack.

* * * * *

UNITED STATES PATENT AND TRADEMARK OFFICE
CERTIFICATE OF CORRECTION

PATENT NO. : 11,201,447 B2
APPLICATION NO. : 16/717979
DATED : December 14, 2021
INVENTOR(S) : Jingzhou Xu It is certified that error appears in the above-identified patent and that said Letters Patent is hereby corrected as shown below:

In the Specification

In Column 6, Line 35, delete "$\tau_D \cdot \tau_S/100.$" and insert --$\tau_D \sim \tau_S/100.$--.

In the Claims

In Column 13, Claim 14, Line 6, delete "$\lambda 2*D(\lambda),$" and insert --$\Delta\lambda*D(\lambda),$--.

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*